US008079215B2

(12) United States Patent
Grassi

(10) Patent No.: US 8,079,215 B2
(45) Date of Patent: Dec. 20, 2011

(54) SYSTEM AND DEVICE FOR UNCOUPLING HYDRAULIC PLANTS

(75) Inventor: Sergio Walter Grassi, Sesto San Giovanni (IT)

(73) Assignee: Inova SRL, Bresso (IT)

( * ) Notice: Subject to any disclaimer, the term of this patent is extended or adjusted under 35 U.S.C. 154(b) by 548 days.

(21) Appl. No.: 12/293,821

(22) PCT Filed: Apr. 24, 2006

(86) PCT No.: PCT/IT2006/000282

§ 371 (c)(1), (2), (4) Date: Sep. 27, 2008

(87) PCT Pub. No.: WO2007/122652

PCT Pub. Date: Nov. 1, 2007

(65) Prior Publication Data

US 2010/0223923 A1 Sep. 9, 2010

(51) Int. Cl.
*F15B 7/00* (2006.01)
*B60J 7/057* (2006.01)

(52) U.S. Cl. ........................................................ 60/476

(58) Field of Classification Search ..................... 60/476
See application file for complete search history.

(56) References Cited

U.S. PATENT DOCUMENTS

| | | | |
|---|---|---|---|
| 2,927,429 | A | 3/1960 | Carlson |
| 3,877,347 | A | 4/1975 | Sheesley et al. |
| 5,329,767 | A | 7/1994 | Hewett |

FOREIGN PATENT DOCUMENTS

| | | | |
|---|---|---|---|
| EP | 0893605 | | 1/1999 |
| EP | 893605 | A1 * | 1/1999 |
| EP | 1223345 | | 7/2002 |
| EP | 1223345 | A2 * | 7/2002 |

* cited by examiner

*Primary Examiner* — Thomas E Lazo
(74) *Attorney, Agent, or Firm* — Themis Law

(57) ABSTRACT

System for controlling the motion of an actuator of a hydraulic system that may be embodied as a circuit or device that, interposed between a pump and the actuator, controls the motion of the actuator, causing the actuator to follow the movement of the pump. The present invention relates both to a system and a device providing such result just on the basis of the measures of the fluid circulating within the hydraulic circuit or device. The system according to the present invention is suited both with opposing loads and dragging loads.

17 Claims, 7 Drawing Sheets

SYSTEM AND DEVICE FOR UNCOUPLING HYDRAULIC PLANTS

TECHNICAL FIELD

The present invention concerns techniques for controlling hydraulic circuits for moving parts of different types of machineries.

In particular, the present invention aims at solving problems that affect generation and control of hydraulic motion.

BACKGROUND ART

Known advantages of hydraulics compared with other techniques of generation and control of energy are the maximum concentration of power compared with other solutions, the good control on movement, and the transfer of heat generated within the circuit from the unit causing the heat to the rest of the circuit and to the tank, where the heat can be easily disposed of. Other techniques of motion control (above all electromagnetic techniques) have progressed more rapidly compared with oleo-dynamics, especially because of the miniaturization and the reduction in the costs of microelectronic components, whereas the hydraulics more slowly, because these new technologies are been used prevalently for a better integration of control components (such as servo-valves) with communication networks.

Together with an inevitable image of "dirty" technology, this limited technological progress is constantly reducing the application of hydraulics from an omnipresent low-cost technique to niche application used only in situations when strictly necessary, promoting, wherever possible, more advanced, silent and clean technologies.

A greater attention for the environment requires that hydraulics reduce environmental impact, in particular, that discharge of polluting substances (such as leaks of hydraulic fluid), energy consumption and problems in working areas (such as noise) be reduced. Another improvement that would be particularly desirable for users of hydraulic components is a greater compactness of the entire system, possibly realized as "black box" to be directly installed into a piece of machinery and interfaced only with the mechanical power points and the electrical controls.

Hydraulic plants can be divided into two large categories according to the technique used for controlling the movement of actuators: pressure control or flow control.

In the past, due to the greater simplicity of component manufacture, hydraulic circuits have been always controlled by pressure, generating the maximum pressure to the pump and dropping it to the required value by means of regulating valves acting as variable bottlenecks. Due to commonality of technology, current circuits generally are constructed using the same control technique, except for extremely specialized situations. Nevertheless, this design method is very inefficient in energy terms, because it generates energy and discharges energy in excess as heat. Recently, specific control systems (called "load sensing") have been developed for increasing energy efficiency but, in spite of that, the technique of "pressure" control keeps remains the least effective in the production of hydraulic circuits.

In contrast, the technique of flow control is much less used, and consists in the direct connection between pump and actuator, without interposition of control valves and/or redirection of flow.

Even if this technique entails a substantial increase in energy efficacy, as the pump processes just the volume necessary for the movement required by the actuator and for the pressure corresponding to the load, it has certain drawbacks. The most widespread type of actuator in the oleo-dynamic field, double effect and single stem, has no symmetry between the extension chamber and the retraction chamber; consequently, its motion involves a variation of the total quantity of fluid in the circuit that must be compensated by a collecting/discharging element, preventive a direct connection of the two doors of the actuator with the corresponding doors of the pump. This problem does not occur with symmetrical actuators (double stem of equal diameter), but the application of this type of actuators involves problems of tie and bulk, as well as an increase in costs due to a double quantity of seals on the stem, which causes this type of hydraulic circuit to be used only in niche sectors.

SUMMARY

The present invention is directed at solving these and other drawbacks by providing a compact system that can be easily inserted in any hydraulic circuit and that can be easily applied, with the technique of the flow control, to common asymmetrical oleo-dynamic actuators, thus getting a precise, simple and economical control of the movement of the fluid, using standard components currently available on the market.

The advantages resulting from the present invention essentially consist in moving loads in two directions, regardless of their direction; in regulating precisely the motion of a hydraulic actuator by the simple insertion of a device between pump and actuator, connected to a compensating tank; in enabling an active control of the movement of the actuator, so to correlate the movement of the actuator in every moment to the movement of the pump; in uncoupling pump and actuator, thereby enabling a motion otherwise prevented by lack of fluid or by excess pressure in the entire circuit; in a simple, economical and compact circuit design, increasing considerably the efficiency of the plant, because the pump processes only the fluid necessary for the movement required by the actuator and for the pressure required by the load, whereas the pump remains still every time the load must not be moved; in allowing the continued use of standard commercial oleo-dynamic actuators; in enabling the direct control of asymmetrical actuators by simply interposing a system according to the invention between pump and actuator and in connecting a system according to the invention with a suitable tank of hydraulic fluid; and in a compact aspect and a minimal bulk of a device according to the invention, without requiring any particular assembly of the hydraulic circuit but simply standard connections.

A circuit according to the present invention provides for direct flow control between pump and asymmetrical actuator (STD), such as a piston or other apparatus, simply by interposing a device between them, making use of a suitable tank of hydraulic fluid that, by compensating the difference in volume of the actuator chambers, provides for a final movement possible with efficiency and constructive simplicity.

In an embodiment of the invention, a compact device is interposed between pump and actuator that, with a supplementary accumulator/tank, directs the flow between the two components. By the term "tank" hereinafter we mean accumulator, i.e. an element that can be pressurized.

In this embodiment, the outflow required by the chambers of the actuator is provided in the same quantity as provided by the pump, even with loads having a same directional movement (which cannot be controlled by simple regulation of the inflow), allowing the system to stop the circuit without causing the pump to actively resists the motion. This guarantees the safety of the circuit, because if energy is not available in a first engine, the different volume capacities of the two chambers of the actuator, caused by the presence of the piston stem, can be compensated, uncoupling the relation between pump and actuator thanks to the new device connected to the tank, from which the fluid is requested (or given) as required. Therefore, the hydraulic system of this embodiment is used symmetrically in relation to the movement of the pump, permitting a flow regulation of actuator movement, without complicating the circuit, and providing for use with all standard actuators already on the market. This embodiment also dynamically normalizes the pressure of the circuit, so that the pump has not to resist the motion in event of dragging loads.

The general working principle of an embodiment of the invention is depicted in the hydraulic scheme of FIG. 1, which may not be convenient in some applications because of its operational complexity and bulk.

as Another embodiment of the invention consists in a compact hydraulic component, shown in FIGS. 7-10, in which all main components are disposed laterally to one another.

In practice, a more compact apparatus may be achieved with three-dimensional configuration (FIG. 12), thereby providing a more compact shape for insertion in any hydraulic circuit.

This invention will be better understood from the following description and the enclosed drawings.

DETAILED DESCRIPTION

This present invention relates to a system for uncoupling hydraulic circuits that includes a bi-directional pump (P) and a standard oleo-dynamic actuator (STD), which are connected by a device that, only on the basis of measures on the circulating flow, controls the motion of the actuator, so that the actuator follows the movement of the pump.

One embodiment of the invention includes a system for controlling the movement of a hydraulic actuator by compensating the volume of circulating fluid between at least one pump and at least one actuator, wherein said fluid is supplied to or drawn from, in variable quantity, to a tank or accumulator (T), according to measures of the circulating fluid. By the above system an active control can be performed on the movement of the actuator, so that it corresponds in every moment to the inflow of the pump. Such control may be carried out by measuring the pressure of the circulating fluid, in both possible directions of movement of the pump and of the actuator. The dynamic activation of a tank connected with at least one part of the circuit permits, in different situation, to absorb fluid in excess or to supply fluid that is otherwise insufficient.

The measure of the pressure (M1, M2) on the inflow of the pump involves opening at least one communication channel (VT1, VT2) between the intake line of the pump and the tank (T), in order to compensate any lack or excess of hydraulic fluid coming from the actuator.

At the same time, from this pressure measure, load losses at the outflow of the actuator can be controlled, in order to maintain always a minimum pressure value. With this measure, the control of the motion of the actuator can be guaranteed even in case of dragging loads, and the actuator can be blocked when the pump is at rest.

The configuration of the hydraulic circuit in the present embodiment enables also a control of the inflow to the actuator by directing the entire flow supplied by the pump to the actuator in positive or negative direction.

An advantage of the present embodiment is that the movement of an actuator is controlled through regulation of the outflow, so that the motion of the actuator always corresponds to the flow supplied by the pump and, inside the chamber of the actuator receiving the flow, no void is created in case of dragging loads.

Accordingly, the system controls the motion of the actuator even in case of dragging loads on the actuator.

Such regulation is effective also in case of dragging loads on the actuator, which cannot be otherwise controlled by a simple action on the inflow, and in case of a void at the pump, stopping the actuator. Said stop is not based on the capability of the pump to keep its two chambers hermetically sealed when not rotating, therefore it is completely effective even in case of drafts in the pump.

In one embodiment, means are included to control the movement of the actuator (A), regardless of the direction of the applied load, even with dragging loads. For example, a series of drives of the outlet valve may be included that, according to the pressure drop, contains the extension of the stem, balancing the flow in the exit chamber.

Therefore, the pump and actuator become uncoupled, compensating hydraulic flows by means of a tank, as the flow from and towards the tank is variable according to the difference in area of the two chambers of the actuator, while the main flow in the circuit remains in the section pump-actuator.

In one embodiment, the circuit may become uncoupled, compensating the difference in volume caused by the stem of the actuator, through a complementary tank with sufficient capacity, and through inlet and outlet valves, either self-regulating or driven by pressure, so that, according to the movement of the cylinder, flow that is lacking or in excess can be adjusted.

Control of the motion of the actuator is carried out even if the exit of the actuator and the relative entrance of the pump are uncoupled in terms of circulating volume.

In one embodiment, connected to the pump (P) and to the actuator (A), there is a tank (T) or accumulator that absorbs or issues hydraulic fluid according to the needs of the system, so to compensate the inflow and outflow in the actuator. This arrangement causes the pump to be activated only when the actuator must be moved, because by the compensating or uncoupling system, the actuator moves simultaneously with the circulation of the fluid set by the pump.

The uncoupling of the backward line is carried out by compensating the volume of total fluid circulating in the pump and in the actuator, thanks to access to a tank, from which fluid is drawn or to which fluid given according to current needs.

The difference between the outflow from the actuator, following its movement, and the intake flow of the pump is compensated in every moment by the exchange with a tank or accumulator.

In one embodiment, the pressure of the fluid coming out from the actuator and absorbed by the pump is normalized according to the pressure of the tank, so that it represents the dissipative element in case of dragging loads. Conveniently, this system is configured to normalize pressure at the intake door of the pump in relation to all or part of the outflow from the actuator, thereby reducing the pressure to a level not higher than the pressure of the tank. In one embodiment, the motion of the actuator includes irreversible features, both of static and dynamic nature.

is the system of the present embodiment is completely symmetrical, and the chamber of the actuator corresponding to the stem can be connected either to branch 1 or 2 of the circuit without any effect on the operation of the circuit.

In one embodiment, any transfer of energy from the actuator to the pump can be prevented, providing an autonomously braking function.

FIG. 1 illustrates one embodiment of the invention, which includes an actuator, preferably a double effect actuator (A), with a connection to a symmetrical circuit relative to the circuit in and out of actuator (A), and which further includes:

at least one element acting as a back vent or controlled flow valve (VA1), which is driven according to the pressure measured in M2;

at least one further back vent or controlled flow valve (VT1), which is driven again according to the pressure measured in M2;

at least one measure point (M1) of the pressure of the outflow from the door (1) of the pump (P);

and symmetrically, on the other part:

at least one element acting as back vent or controlled flow valve (VA2), which is driven according to the pressure measured in M1;

at least one further back vent or controlled flow valve (VT2), which is driven again according to the pressure measured in M1;

at least one measure point (M2) of the pressure of the outflow from the door (2) of the pump (P).

In this embodiment, VA1 and VA2 are back vents that prevent the outflow from the corresponding chambers of the actuator, unless they receive pressure on the driving line, respectively from measure points M2 and M1.

In the presence of driving pressure, the above cited back vents act, in relation to the outflow from the chambers of the actuator, as variable load controls having an intensity inversely proportional to the driving pressure, without preventing the free entrance of the inflow.

Additionally, VT1 and VT2 are back vents that prevent the flow from the circuit to tank (T), unless they receive driving pressure respectively from M2 and M1. In the direction from tank (T) to circuit, back vents VT1 and VT2 do not prevent the circulation of the fluid, thereby providing an anti-cavitation function.

M1 and M2 are the points that register the pressure of their relative doors of the pump (P) and send it back to vents VT and VA in order to control their operation.

As shown, the circuit uses tank (T) for fluid compensation.

Therefore, the system works as described hereinafter, where “branch” 1 (or 2) of the system indicates the portion of device placed between the door 1 (or 2) of pump (P) and valve VA1 (or VA2), but not including these. The rotation of pump (P) sends fluid in one of the two branches of the system (e.g. branch 1) and the relative valve at the actuator (A) (e.g. VA1) spontaneously opens to receive the fluid in the corresponding chamber of the actuator (A). AT first actuator (A) does not move because the valve on the opposite branch (e.g. VA2) remains closed. Pump (P) keeps on rotating and thus causing the pressurization of the branch where the fluid is transferred (e.g. branch 1) until the outlet valve of actuator (A) reaches driving pressure and gradually opens, making actuator (A) move.

As driving pressure on the outlet valve is constantly required, this system involves a closed retroaction ring that keeps the driving pressure constant (in case of constant load, otherwise at an intensity proportional to the instantaneous value of the load). This mode of operations is possible only if the rate of increase in volume of the chamber connected to the inflow branch (e.g. branch 1) corresponds exactly, in every moment, to the outflow from pump (P). The final result of the configuration of this system is that the motion of actuator (A) exactly repeats the rotation of pump (P), no matter what the intensity and time variation of the applied load are. The outflow from actuator (A) is controlled so to send back directly to pump (A) the greatest possible quantity of fluid, integrating and removing the remaining flow due to the different cross-sectional areas of the two chambers of the actuator.

The above described system operates differently in the specific case of an extension cylinder with opposite load (FIG. 2) and dragging load (FIG. 3).

In the enclosed drawings that represent the operation of the system, V+ indicates the direction of movement of the extension cylinder, whereas F (positive or negative) indicates the applied load respectively opposed to the motion (FIG. 2 and FIG. 5), or dragging (FIG. 3 and FIG. 4), in which case the system will control of the motion resisting the discharge in relation to the force exerted on the cylinder by the same load.

In the f embodiment depicted in FIG. 2, (V+/F+), pump (P) rotates, giving the fluid a clockwise movement inside the depicted circuit. This movement, due to the volume asymmetry of the chambers (A1 and A2) caused by the bulk of the stem, requires an inflow of fluid from tank (T) to the hydraulic circuit.

This is made possible because of the increase in pressure at point M1, which causes valve VT2 to open and permits the circulation in the circuit of the fluid missing in chamber A1, such fluid being provided by tank (T). The same pressure M1, driving simultaneously VA2, guarantees an opening of the chamber of the cylinder that must be emptied (A2).

Even in absence of driving pressure, valve VT2 would however open spontaneously, since valve VT2 is disposed to provide an anti-cavitation function. FIG. 3 shows the operation of the circuit still with the extension cylinder (A), but this time with a dragging load (V+/F−), i.e. moving in the same direction as the motion.

The components of the system are similar to those in FIG. 2, but since i an outflow regulation on chamber (2) is required, the pressures is exerted in a direction opposite to the extension of the cylinder, which will result controlled according to the movement of pump (P).

In the embodiment of FIG. 3, pump (P) rotates giving the fluid a clockwise circulation, but in this case, due to the nature of the load (traction on the stem), chamber 1, before the activation of the pump (P), is not pressurized. Therefore, the initial movement of pump (P) transfers the fluid without pressure on branch 1 (R1). The pump however operates with the no-void pressure in tank (T) and the spontaneous opening of valve VT2 in anti-cavitation function, while actuator (A) is at rest thanks to valve VA2, which is closed because of the pressure in chamber A2 of actuator (A), which activates its back-directed function.

On branch (R1), valve VT1 remains closed, while VA1 opens for the normal flow toward chamber 1 (A1).

The increase in pressure in the entrance chamber of actuator (A), caused by the constant rotation of pump (P), eventually exceed the pressure in branch 2 (R2) and therefore in tank (T). This situation consequently causes, like in the previous embodiment, the opening of valve VA2 that, when open, lets the fluid regularly flow out from chamber 2 of cylinder (A2) and then the movement starts, restoring the above described operation.

Nevertheless, if the extension movement, due to the dragging applied load (F−), involves a reduction in the pressure of chamber (A1), such a load drop, following the decrease in the driving pressure in VA2, would require a greater drop in the pressure at exit, slowing down the movement and restoring a dynamic balance that produces a direct control on the motion of the pump of actuator (A).

FIGS. 4 and 5 respectively show two opposite cases of motion of actuator (A) in the direction of retraction of the stem (V−). In both cases, the quantity of fluid entering chamber 2 (A2) will be less, the opposite course being equal, due to the volume taken up by the stem. Therefore, in both cases, this system needs to discharge the fluid in excess into tank (T).

FIG. 4 shows an embodiment of the invention, in which the load is allied in an opposite direction to the motion. In the embodiment of FIG. 4, the rotation of pump (P) is opposite, causing the fluid circulate anti-clockwise compared with the scheme depicted in FIGS. 2 and 3.

Therefore, the rotation exerts pressure on branch 2 (R2) of the circuit, directing the fluid into chamber (A2) of actuator (A) and moving the piston in traction when the pressure of the circuit is more than the pressure in the entrance chamber, because of the load (F−). The pressure present in drive VA1 ensures its opening, making actuator (A) move, while pressure enters point (M2), causing also a driving of VT1. This condition connects related branch (R1) with tank (T), permitting to discharge the fluid in excess, in the same volume as the volume at the end of the stem in chamber 2 (A2). VT2, not driven, remains "normally closed".

The embodiment of FIG. 5, similarly to the previous embodiment, shows that this system, activating the cylinder in retraction, needs to discharge the fluid in excess into tank (T).

Nevertheless, this movement of the fluid needs an active control because of the applied dragging load (F+), in order to avoid an uncontrolled motion of actuator (A).

When the pump is at rest, chamber (A1) of actuator (A) is pressurized by applied load (F+) and valve (VA1) is closed. This causes chamber A2 to have the same pressure as the line of the circuit (and of tank T), a pressure logically lower than the pressure in A1, because of the load.

By activating pump (P), and by causing the fluid to flow in counterclockwise direction, the fluid enters branch 2 of the circuit (R2), increasing its pressure, and thanks to the spontaneous opening of valve (VA2), the fluid enters the actuator (chamber A2), increasing its pressure. The pressurization of branch 2, and therefore also of point M2, gradually reaches a pressure value sufficient to drive VA1, so permitting the outflow from chamber (A1) and consequently moving the piston.

Like in the previous case of dragging load, the load loss that occurs in VA1 operates as an active control of the system, correlating the motion of the piston to the quantity of the fluid entering branch 2 (R2). As a consequence, a fixed relation between speed of the motion and start of pump (P) is established. The constant driving pressure in point M2 allows the valve VT1 to remain open, so permitting the discharge in (T) of the surplus fluid.

In constructing a hydraulic circuit according to the principles of the present invention, suitable relations between the points measuring pressure, drives and consequent dimensions of all the components should be established.

Nonetheless, such a hydraulic circuit may result to be complex and difficult to realize in practice, especially because of its bulk, causing this solution to be considered non-economical and consequently much less convenient to use.

Accordingly, the present invention further includes a single compact hydraulic component, which can be removably interposed by common connections between pump (P), tank (T) and actuator (A), such a component comprising all the devices necessary to realize the cited functions of the invention.

FIG. 6 is a cross-section showing a compatible solution to the above described principles of the present invention. The depicted apparatus is formed as a single metal block, making it easy to insert in a hydraulic plant with small bulks, practical to install and suitable for interposing between pump, tank and actuator in a linear and immediate way.

The described system is based on the basic configuration described hereinabove with reference to the hydraulic circuits of FIGS. 2, 3, 4 and 5.

This system has a parallelepiped shape and is depicted sectioned in the middle, where the individual devices have perpendicular and/or parallel axes, such devices being connected as follows:

doors (P1) and (P2) are respectively the exits in connection with the chambers of the pump (P1) and (P2); A1 and A2 are respectively in connection with the homonym chambers of the cylinder, A1 and A2, while T1 and T2 are both connected to compensating tank (T).

The elements indicated by letter (C "n") are the movable parts of the valves specified as follows: the cursors C1 and C3 are the elements controlling the passages of the valves, respectively VA1 and VA2; and pistons C5 and C7 are simultaneously the measure points and the elements activating valves VA1 and VA2. Springs M5 and M7, placed under pistons C5 and C1, have the task of producing a position proportional to the difference between the driving pressures and the pressures of the branches (1 and 2) of the circuit, according to the operations to be fulfilled. The conical shape of cursors C1 and C3 is designed to translate this position into a variable load loss, and both cursors (C1 and C3) are open to receive the outflow from the valve to actuator (A), whereas, when the respective activating pistons are at rest, cursors C1 and C3 spontaneously close to an inflow from actuator (A) to the valve, thereby carrying out all the functions required from valves VA1 and VA2 (even when controlling the exit on dragging loads).

If a delta P Max is exceeded, as defined by the rigidity of springs M5 and M7, the relative pistons arrive at their end stops, so generating a complete opening of the elements controlling the flow, and minimizing the energy waste due to load losses in the event of rapid movements that require a very intense flow through the circuit.

Cursors C2 and C4 are the elements controlling the fluid in the driven back vents (respectively (T1) and (T2)), while pistons C6 and C8 are the relative measure points (M2 and M1 in the hydraulic circuits described hereinabove) and activating elements. Similarly to pistons C5 and C7, springs M6 and M8 are designed to translate into shift a difference in pressure (delta P) between the branches of the circuit (R1 and R2) and the part of the circuit with low pressure, while cursors C2 and C4 are standard back vents that offer a minimum resistance to springs M4 and M2.

The structure of this embodiment is completely symmetrical and does not require particular connections between doors A1 and A2 and actuator (A). This system works correctly even if connected in the opposite way to the way described in FIG. 6 (A1 on VA2 and A2 on VA1).

Considering the practical solution depicted in FIG. 6, showing a cross-section of an embodiment of the invention, FIGS. 7, 8, 9 and 10 respectively show different operations in traction and extension, with loads related to motion or dragging, similarly to the operations described for the previous hydraulic circuits.

Finally, FIG. 11 shows an embodiment of the invention as a device (D), constructed to operate according to the embodiments of FIGS. 7, 8, 9 and 10.

Even if such a manufacturing solution is compact, it mat be further improved with a device (D), as depicted in FIG. 12, placing the elements and the relative connections in a three-dimensional shape that is more compact than that illustrated in FIG. 11.

In practice, manufacturing details may further vary as regards shape, size, position of elements, and type of materials used, but still remain within the scope and spirit of the present invention.

BRIEF DESCRIPTION OF THE DRAWINGS

The cited advantages, purposes and characteristics of the present invention will be better understood by every expert in this field by referring to the enclosed diagrams and drawings, given as practical examples of the invention but not to be considered restrictive.

FIG. 2 shows an embodiment of the invention having an extension cylinder with an opposite load, whereas

Figure 1:
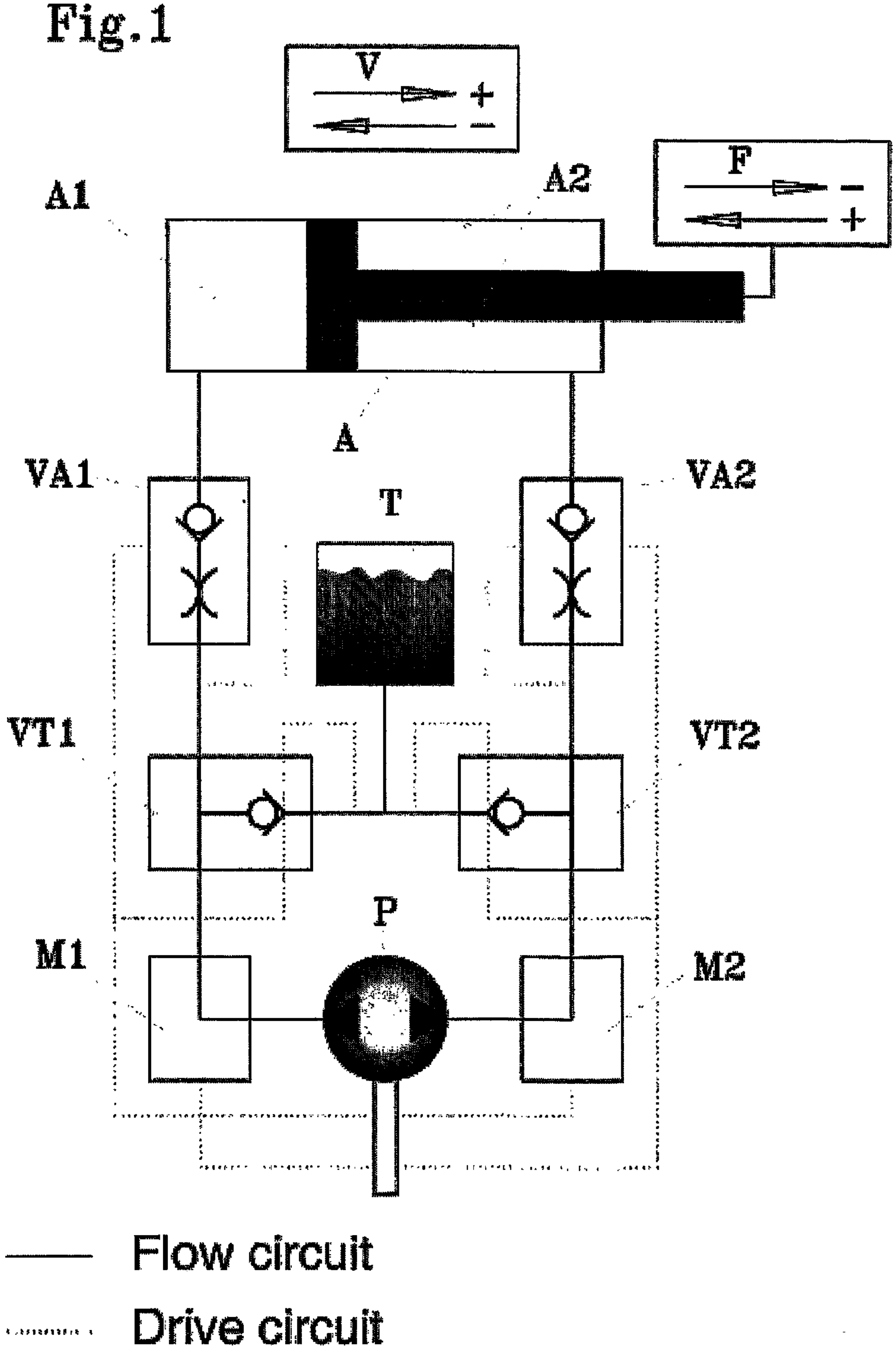
FIG. 1 shows the hydraulic circuit representing an embodiment of the invention.
Figure 2:
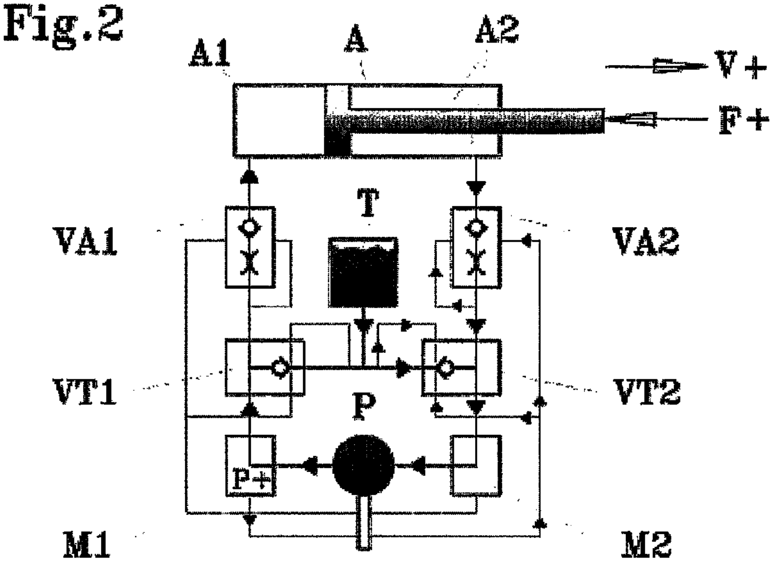
Figure 3:
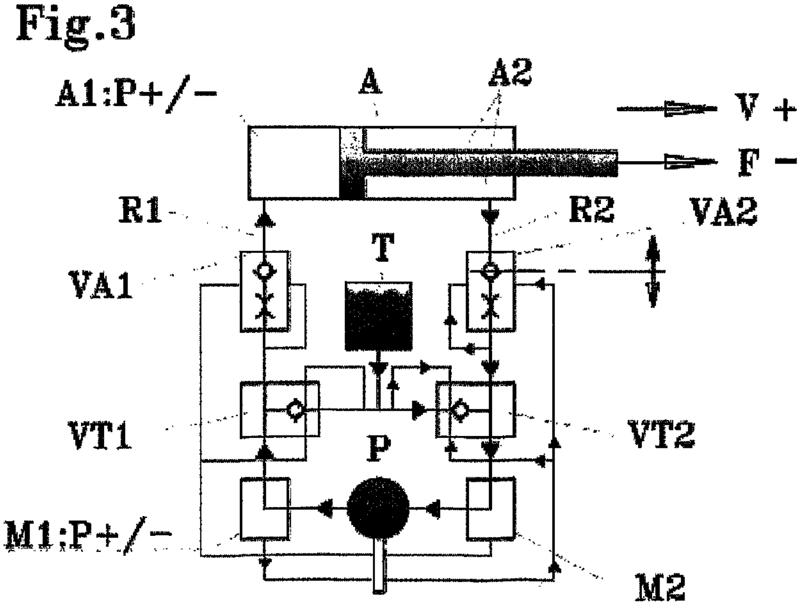
FIG. 3 shows the extension cylinder with a dragging load.
Figure 4:
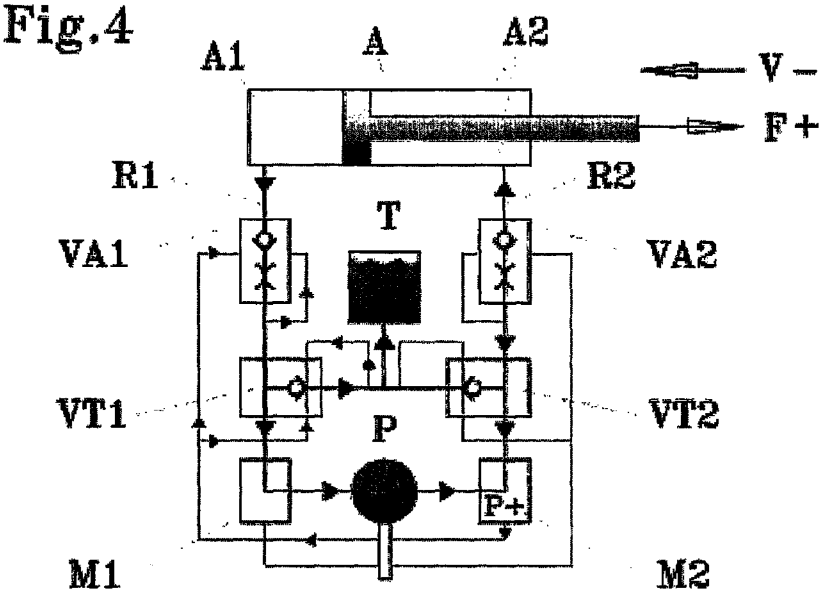
FIGS. 4 and 5 show the operation of a hydraulic circuit according to an embodiment of the invention with motion in retroaction.
Figure 5:
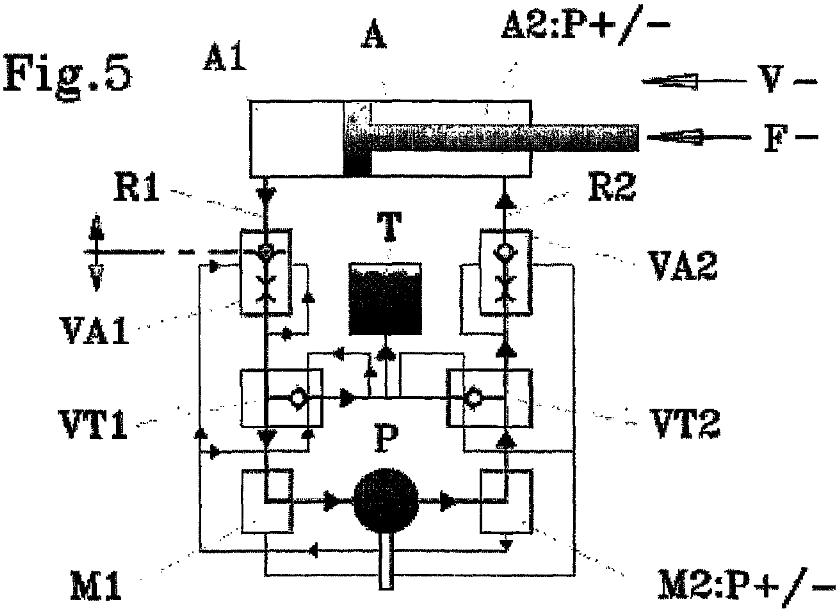
Figure 6:
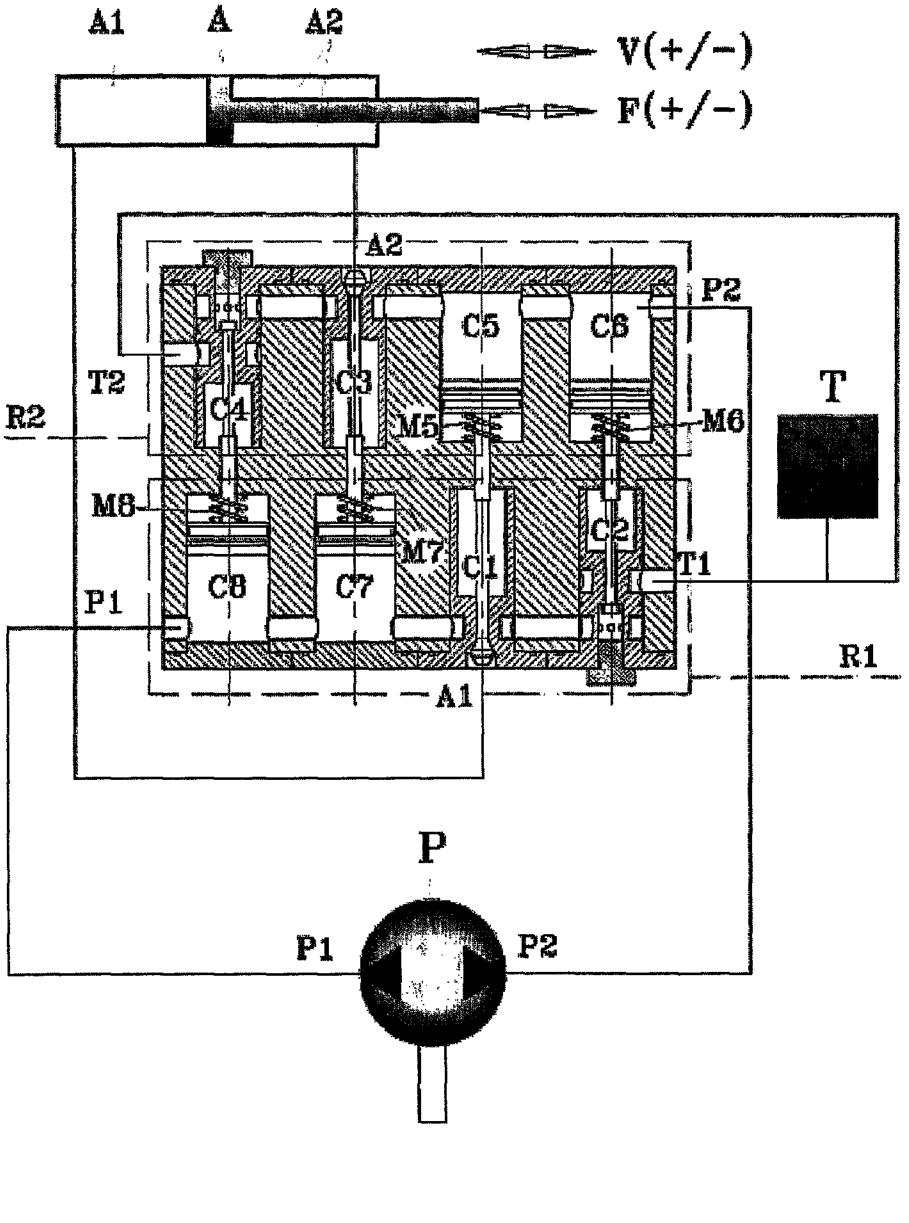
FIG. 6 shows an embodiment of the invention made of a single metal block, therefore easy to insert in a hydraulic circuit of limited volume.
Figure 7:
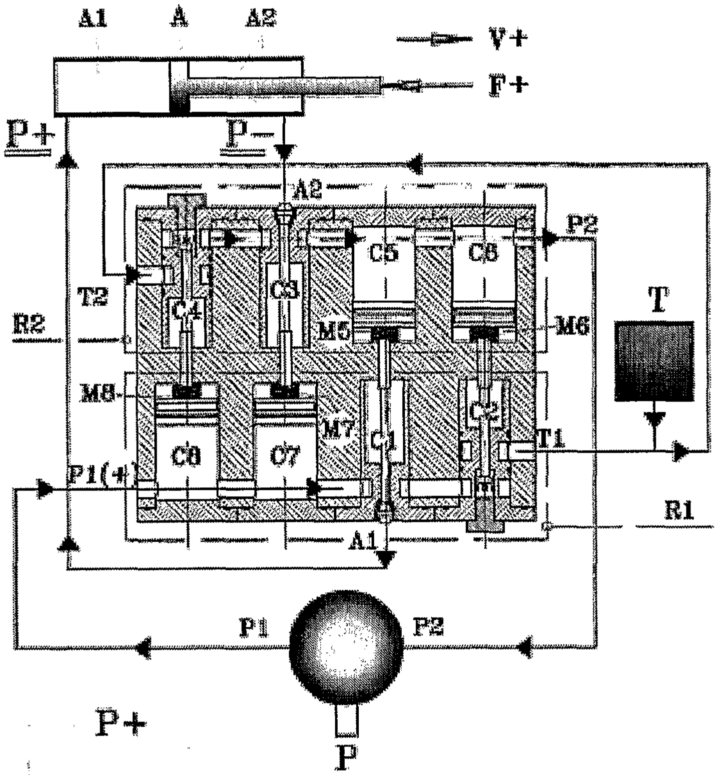
FIGS. 7 and 8 and FIGS. 9 and 10 show different operations of an embodiment of the invention in traction and extension, with opposite loads to the motion or dragging loads.
Figure 8:
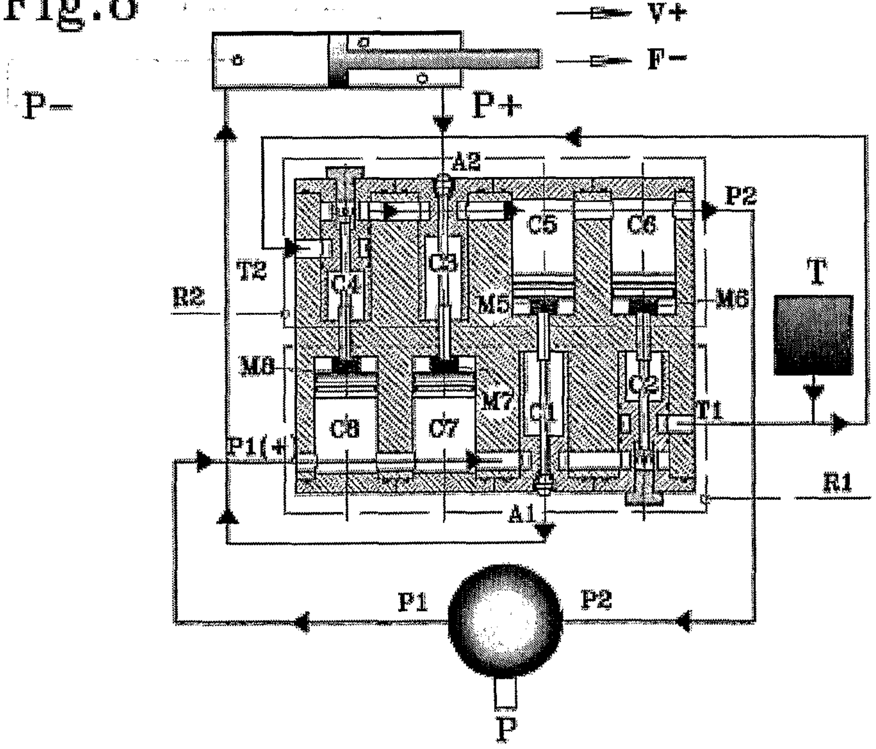
Figure 9:
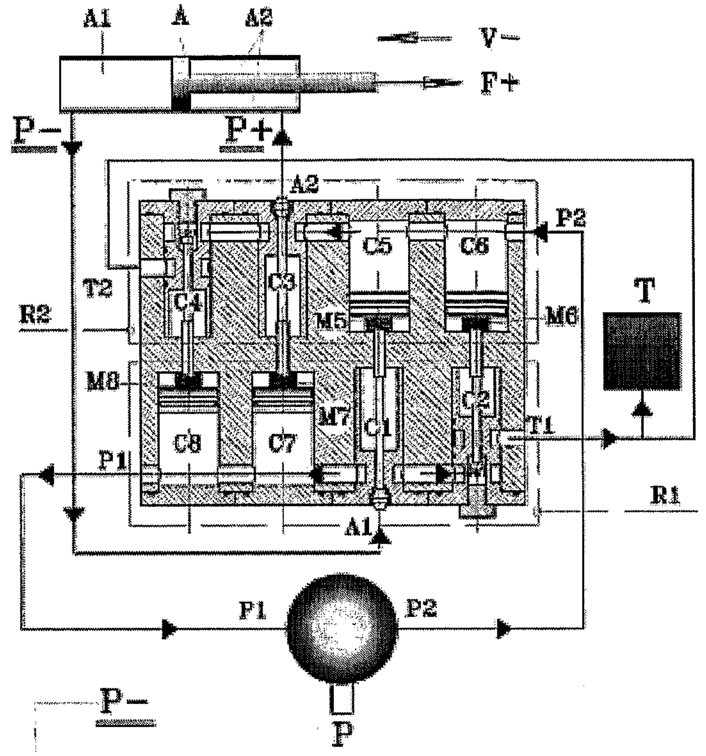
Figure 10:
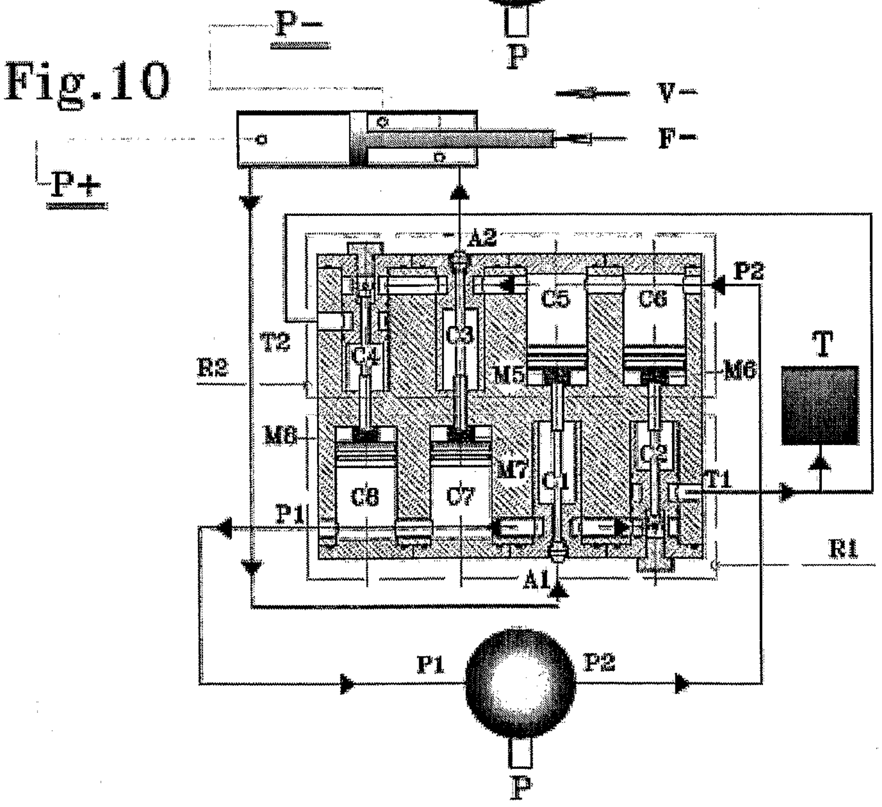
Figure 11:
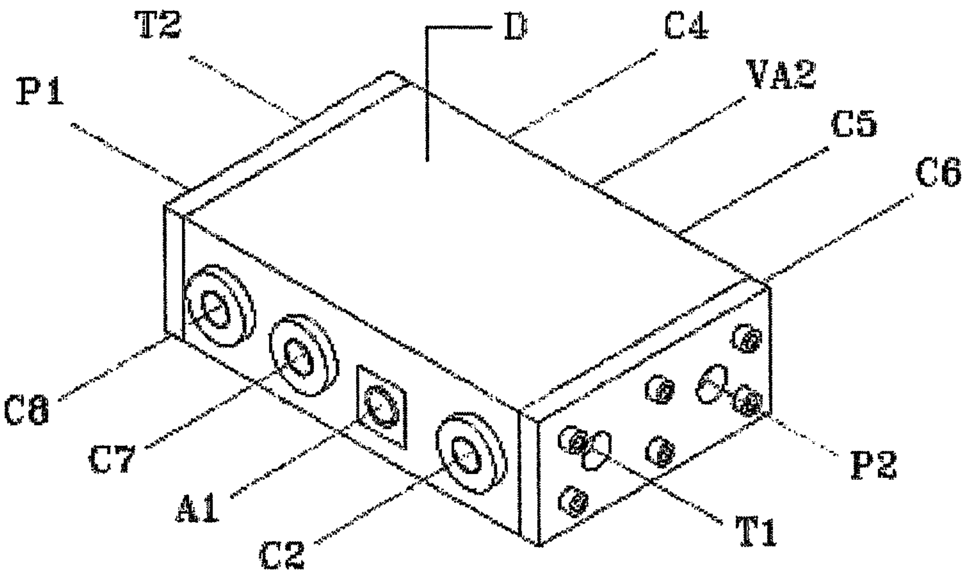
FIG. 11 shows the aspect of a device constructed to apply the principles of the circuits of FIGS. 7-10.
Figure 12:
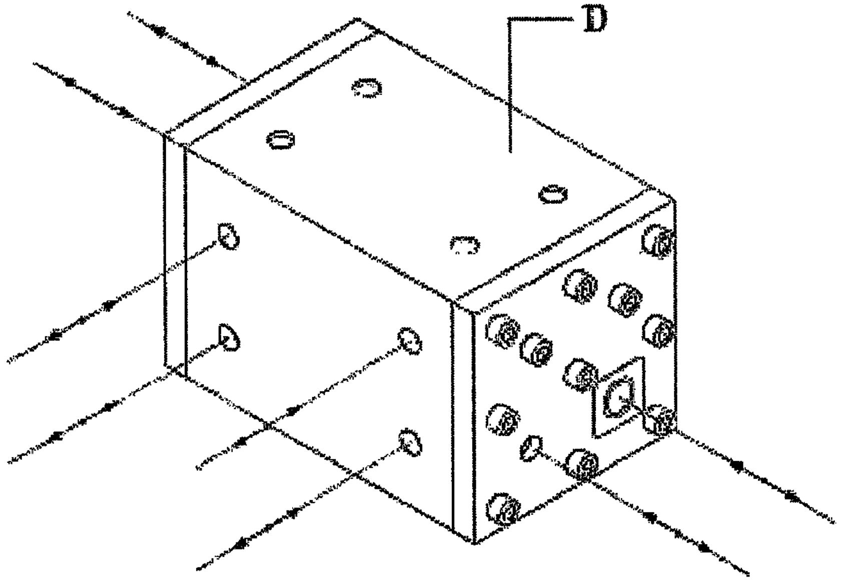
FIG. 12 shows another embodiment of a device according to the present invention.

The invention claimed is:

1. A system for uncoupling hydraulic plants comprising:

a bidirectional pump;

a hydraulic actuator, wherein the pump and the actuator are connected by a device that, only on a basis of measures on circulating fluid between the pump and the actuator, controls a motion of the actuator, causing the actuator to follow a movement of the pump;

wherein the actuator and the pump are connected with a symmetrical hydraulic circuit, the symmetrical hydraulic circuit comprising a first branch and a second branch, wherein the first branch comprises, a first controlled flow valve driven according to a pressure measured at a measure point in the second branch, a second controlled flow valve driven according to the pressure measured at the measure point in the second branch, and a measure point in the first branch, the measure point in the first branch measuring the pressure at an outflow from a first door of the pump, and wherein the second branch comprises, a third controlled flow valve driven according to a pressure measured at the measure point in the first branch, a fourth controlled flow valve driven according to the pressure measured at the measure point in the first branch, and the measure point in the second branch, the measure point in the second branch measuring the pressure of an outflow from a second door of the pump, the first door and the second door regulating inflow and outflow from the pump, the first and the second controlled flow valves being connected to a tank;

a first cursor controlling flow of the first controlled flow valve and a second cursor controlling flow of the third controlled flow valve;

a first and a second pistons providing the measure points in the first and respectively in the second branches; and a first and a second springs coupled to the first and the second pistons, the first and the second springs causing the first and the second pistons to move proportionally with a difference between the pressures in opposing chambers of the actuator and the pressures in the first and the second branches.

2. The system as claimed in claim 1, wherein the measures are measures of pressure of the circulating fluid.

3. The system as claimed in claim 1, wherein the circulating fluid may flow in opposite directions, and wherein the control of the motion of the actuator is carried out in both possible directions of circulating fluid.

4. The system as claimed in claim 1, further comprising a dynamic activation of the tank which is connected with at least one part of a hydraulic circuit between the pump and the actuator, wherein the tank is positioned to absorb fluid in excess or to supply fluid that is required in the hydraulic circuit between the pump and the actuator.

5. The system as claimed in claim 4, wherein a measure of pressure at an inflow of the pump involves opening a communication channel between an intake line of the pump and the tank, so to compensate any lack or excess of the fluid provided by the actuator.

6. The system as claimed in claim 5, wherein said pressure measure involves regulating a load loss at an outflow of the actuator, in order to keep always a minimum pressure value without creating a void condition at an inflow of the pump, and wherein said pressure measure controls the motion of the actuator in case of dragging loads and blocks the actuator when the pump is at rest.

7. The system as claimed in claim 1, wherein a difference between an outflow from the actuator, following the motion of the actuator, and an intake flow at the pump is compensated in every moment by an exchange of with the tank.

8. The system as claimed in claim 7, wherein pressure of the circulating fluid exiting the actuator and drawn by the pump is normalized on the basis of a pressure in the tank, the tank providing a dissipative element when a dragging load is applied to the actuator.

9. The system as claimed in claim 8, wherein a pressure to power an intake door of the pump is normalized with all or part of the outflow from the actuator, thereby reducing the pressure at the intake door of the pump to a level not higher than the pressure in the tank.

10. The system as claimed in claim 1, wherein the system is configured to prevent a transfer of excess energy from the actuator to the pump, thereby providing a braking function.

11. The system as claimed in claim 1, wherein the first and the second branches are interposed between the pump, the tank, and the actuator.

12. The system as claimed in claim 1, wherein the first and the second cursors are conically shaped and designed to translate so to generate a variable load loss, and wherein the first and the second cursors are configured to open and provide flow from at least one of the first and third controlled flow valves to the actuator while preventing flow from the actuator through the first and the third controlled flow valves.

13. The system as claimed in claim 12, wherein the first and the second pistons generate a complete opening of the first and the third controlled flow valves, thereby minimizing energy waste due to load losses in case of accelerated flow of the circulating fluid through the system.

14. The system as claimed in claim 12, further comprising a third and a fourth cursors coupled to third and fourth pistons, wherein the third and the fourth cursors control the flow of the circulating fluid in the second and the fourth controlled flow valves, and wherein the first and the second pistons operate as the measure points in the first and in the second branches.

15. The system as claimed in claim 14, further comprising third and fourth springs coupled to the third and the fourth pistons, wherein the third and the fourth springs translate into shift a difference in pressure between the first and the second branches.

16. The system as claimed in claim 12, wherein the system is configured to operate symmetrically, thereby causing a proper operation of a hydraulic circuit regardless of direction of the circulating fluid.

17. The system as claimed in claim 1, wherein the actuator is oleo-dynamic.

* * * * *